United States Patent [19]

Suh et al.

[11] Patent Number: 6,005,013
[45] Date of Patent: Dec. 21, 1999

[54] GEAR THROTTLE AS A NUCLEATION DEVICE IN A CONTINUOUS MICROCELLULAR EXTRUSION SYSTEM

[75] Inventors: Nam P. Suh, Sudbury, Mass.; Torsten Hermann, Planegg, Germany

[73] Assignee: Massachusetts Institute of Technology, Cambridge, Mass.

[21] Appl. No.: 08/696,650

[22] Filed: Aug. 14, 1996

[51] Int. Cl.[6] ............................................ C08J 9/00
[52] U.S. Cl. ........................ 521/79; 264/53; 425/4 R; 425/817 R; 521/81; 521/155; 521/917
[58] Field of Search .............................. 521/79, 81, 155, 521/917; 264/53; 425/4 R, 817 R

[56] References Cited

U.S. PATENT DOCUMENTS

| | | | |
|---|---|---|---|
| 3,108,148 | 10/1963 | Coyner | 261/141 |
| 3,227,664 | 1/1966 | Blades et al. | 260/2.5 |
| 3,227,784 | 1/1966 | Blades et al. | 264/53 |
| 3,277,221 | 10/1966 | Parrish | 264/53 |
| 3,343,214 | 9/1967 | Myers | 18/12 |
| 3,375,211 | 3/1968 | Parrish | 260/2.5 |
| 3,375,212 | 3/1968 | Bonner, Jr. | 260/2.5 |
| 3,384,531 | 5/1968 | Parrish | 161/159 |
| 3,406,230 | 10/1968 | Baxter et al. | 264/51 |
| 3,431,164 | 3/1969 | Gilbert | 161/161 |
| 3,584,090 | 6/1971 | Parrish | 264/45 |
| 3,624,192 | 11/1971 | McCoy et al. | 264/51 |
| 3,720,572 | 3/1973 | Soda et al. | 161/143 |
| 3,796,779 | 3/1974 | Greenberg | 264/50 |
| 3,937,777 | 2/1976 | Wienand et al. | 264/53 |
| 3,981,649 | 9/1976 | Shimano et al. | 425/4 |
| 3,988,404 | 10/1976 | Orimo et al. | 264/45.9 |
| 4,260,351 | 4/1981 | Takano et al. | 425/113 |
| 4,344,710 | 8/1982 | Johnson et al. | 366/76 |
| 4,344,907 | 8/1982 | Herrington | 264/173 |
| 4,350,663 | 9/1982 | McAlister | 422/137 |
| 4,424,287 | 1/1984 | Johnson et al. | 521/74 |
| 4,436,679 | 3/1984 | Winstead | 264/40.3 |
| 4,454,087 | 6/1984 | Hayashi et al. | 264/53 |
| 4,470,938 | 9/1984 | Johnson | 264/50 |
| 4,473,665 | 9/1984 | Martini-Vvedensky et al. | 521/79 |
| 4,548,775 | 10/1985 | Hayashi et al. | 264/45.5 |
| 4,728,559 | 3/1988 | Hardenbrook et al. | 428/159 |
| 4,761,256 | 8/1988 | Hardenbrook et al. | 264/45.5 |
| 4,764,538 | 8/1988 | Buckmaster et al. | 521/85 |
| 4,873,218 | 10/1989 | Pekala | 502/418 |
| 4,906,672 | 3/1990 | Stone et al. | 521/130 |
| 5,032,621 | 7/1991 | Buckmaster et al. | 521/85 |
| 5,034,171 | 7/1991 | Kiczek et al. | 264/51 |
| 5,082,608 | 1/1992 | Karabedian et al. | 264/46 |
| 5,098,267 | 3/1992 | Cheng | 425/4 R |
| 5,110,998 | 5/1992 | Mushiatti | 174/24 |
| 5,124,096 | 6/1992 | Brambilla | 264/45.5 |
| 5,128,382 | 7/1992 | Elliott, Jr. et al. | 521/178 |
| 5,158,986 | 10/1992 | Cha et al. | 521/82 |
| 5,160,674 | 11/1992 | Colton et al. | 264/50 |
| 5,227,103 | 7/1993 | Muschiatti | 264/45.9 |
| 5,250,577 | 10/1993 | Welsh | 521/79 |
| 5,266,605 | 11/1993 | Welsh | 521/146 |
| 5,286,429 | 2/1994 | Blythe et al. | 264/51 |
| 5,334,356 | 8/1994 | Baldwin et al. | 422/133 |
| 5,340,844 | 8/1994 | Welsh et al. | 521/82 |
| 5,356,944 | 10/1994 | Blythe et al. | 521/146 |
| 5,358,675 | 10/1994 | Campbell et al. | 264/50 |
| 5,369,135 | 11/1994 | Campbell et al. | 521/134 |
| 5,610,203 | 3/1997 | Buckmaster et al. | 521/85 |
| 5,670,102 | 9/1997 | Perman et al. | 264/50 |
| 5,712,318 | 1/1998 | Buckmaster et al. | 521/85 |
| 5,889,064 | 3/1999 | Herrmann | 521/82 |

FOREIGN PATENT DOCUMENTS

| | | |
|---|---|---|
| 0 039 041 A2 | 11/1981 | European Pat. Off. |
| 0 376 064 A2 | 7/1990 | European Pat. Off. |
| 0 411 923 A2 | 2/1991 | European Pat. Off. |
| 0 441 762 A2 | 8/1991 | European Pat. Off. |
| 0 453 687 A1 | 10/1991 | European Pat. Off. |
| 0 528 536 A1 | 2/1993 | European Pat. Off. |
| 0 707 935 A2 | 4/1996 | European Pat. Off. |
| 0 722 975 A1 | 7/1996 | European Pat. Off. |
| 25 01 966 | 7/1975 | Germany. |
| 34 21 634 | 1/1986 | Germany. |
| 36 00 041 | 7/1987 | Germany. |
| 9411804 | 10/1994 | Germany. |
| 44 25 319 | 1/1996 | Germany. |
| WO 89/00918 | 2/1989 | WIPO. |
| WO 90/07546 | 7/1990 | WIPO. |
| WO 92/17533 | 10/1992 | WIPO. |
| WO 95/24440 | 9/1995 | WIPO. |
| WO 96/00644 | 1/1996 | WIPO. |
| WO 96/16782 | 6/1996 | WIPO. |
| WO 96/41709 | 12/1996 | WIPO. |

OTHER PUBLICATIONS

Baldwin, D.F. et al., "A Processing System for the Extrusion of Microcellular Polymer Sheets: Shaping and Cell Growth Control", Cellular and Microcellular Materials, Proceedings of the 1994 International Mechanical Engineering Congress and Exposition held Nov., 1994, MD–vol. 53:85–107 (ASME 1994).

(List continued on next page.)

Primary Examiner—Morton Foelak
Attorney, Agent, or Firm—George W. Neuner; Dike, Bronstein, Roberts & Cushman, LLP

[57] ABSTRACT

Disclosed herein is an improvement in microcellular or supermicrocellular polymer extrusion systems. Both conventional and microcellular systems employ an extruder which plasticates polymer pellets into a polymer melt; a gas metering system, whereby a gas is injected directly in the polymer melt flow in the extruder; a mixing and homogenizing section of the extruder, which creates a single-phase solution of the polymer and the gas; and a nucleation device at the outlet end of the extruder. In this invention, the improvement to the conventional system comprises the nucleation means attached to said extruder which is a gear pump acting as a throttle rather than a pump. With this improvement, the discharge pressure is dictated by die resistance and flow rate as delivered by the gear throttle, and the pressure drop of the polymer/gas single-phase solution is nearly instantaneous.

24 Claims, 2 Drawing Sheets

OTHER PUBLICATIONS

Baldwin, D.F. et al. ,An Extrusion System for the Processing of Microcellular Polymer Sheets: Shaping and Cell Growth Control, May 1996, pp. 1425–1435, Polymer Engineering and Science, vol. 36 No. 10.

LeMay, J.D. et al. "Low Density Microcellular Material", MRS Bulletin, Dec. 1990, pp. 19–45.

Martini, J. The Production and Analysis of Microcellular Foam, Master's Thesis, Mechanical Engineering, MIT, Aug., 1981, 153 pp.

Park, C. B. et al., "Filamentary Extrusion of Microcellular Polymers Using a Rapid Decompressive Element" Polymer Engineering & Science, vol. 36, No. 1, Jan. 15, 1996, pp. 34–48, XP000583331.

Park, C.B. et al, "Cell Nucleation by Rapid Pressure Drop in Continuous Processing of Microcellular Plastics", Use of Plastics and Plastic Composites: Materials and Mechanics Issues, MD–vol. 46, pp. 537–552, ASME 1993.

Park, C.B. et al., "Axiomatic Design of a Microcellular Filament Extrusion System", Research in Engineering Design, 1996, pp. 166–177.

Park, C.B., et al., "Effect of the Pressure Drop Rate on Cell Nucleation in Continuous Processing of Microcellular Polymers", Polymers Engineering and Science, vol. 35, No. 5, pp. 432–440, Mar. 1995.

Stevenson, James F., "Polymer Processing", "Microcellular Plastics", Chapter 3, Hansen/Gardner Publications, Inc. 1996.

English translation of WO/96/41709, submitted on Mar. 4, 1997 as AA on PTO–1449 Form.

Japanese Patent Abstract, Publication No. JP60210419, vol. 10, No. 066 (M–461), (Kazuo Makino), Oct. 22, 1995.

Cha, Sung Woon, "A Microcellular Foaming/Forming Process Performed At Ambient Temperature and a Supermicrocellular Foaming Process", Ph.D. Thesis, MIT, Cambridge, MA, 1994.

Baldwin, D.F., "Microcellular Polymer Processing and the Design of a Continuous Sheet Processing System," Ph.D. Thesis, Massachusetts Institute of Technology, Cambridge, MA 1994.

Collias, D.J. and Baird, D.G., "Does a Microcellular Structure Improve the Modulus of toughness of a Polymer Matrix," *Society of Plastics Engineers Technical Papers*, vol. 38, pp. 1532–1535, 1992.

Crank, J., The Mathematics of Diffusion, Clarendon Press, Oxford, pp. 203–253, 1975.

Domininghaus, H., Die Kunststoffe und ihre Eigenshaften, vol. 4, VDI verlag, Dusseldork, p. 847, 1992, (in German).

Durril, P.L. and Griskey, R.G., "Diffusion and Solution of Gases in Thermally Softened or Molten Polymers: Part II," *A.I.Ch.E. Journal*, vol. 15, pp. 106–110, 1969.

Krevelen, D.W. Van, Properties of Polymers, Elsevier, New York, pp. 404–425, 1976.

Koros, W.J. and Paul, D.R., "Sorption and Transport of $CO_2$ Above and Below the Glass Transition of Poly(ethylene terephthalate)," *Polymer Engineering and Science*, vol. 20, pp. 14–19, 1980.

Newitt, D.M. and Weale, K.E., "Solution and Diffusion of Gases in Polystyrene at High Pressures," *Journal of Chemical Science*, Part II, pp. 1541–1549, 1948.

Park, C.B., "The Role of Polymer/Gas Solutions in Continuous Processing of Microcellular Polymers," Ph.D., Thesis, Massachusetts Institute of Technology, Cambridge, MA 1993.

Rabinowitsch, B., "Uber die Viskositat und Elastizitat vol Solem", *Phys. Chemie.*, vol. 145, p. 1/26, 1929, (in German).

Rabinowitsch, B., "Uber die Viskositat und Elastizitat vol Solem", *Zs. Phys. Chemie.*, vol. 145, p. 1/26, 1929, (in German).

Seeler, K.A. and Kumar, V., "Fatique of Notched Microcellular Polycarbonate." *Cellular Polymers*, MD–vol. 38, ASME. pp. 93–108, 1992.

Seeler, K.A. and Kuxmar, V., "Tension–Tension Fatique of Microcellular Polycarbonate: Initial Results." *Journal of Reinforced Plastics and Composites*, vol. 12, pp. 359–376, 1993.

Suh, N.P., "Microcellular Plastics," Innovations in Polymer Processing (Ed. by J. Stevenson), 1995.

GEAR THROTTLE AS A NUCLEATION DEVICE IN A CONTINUOUS MICROCELLULAR EXTRUSION SYSTEM

STATEMENT OF GOVERNMENT SUPPORT

The present invention was made with government support under Grant No. CTS-9114738 awarded by the National Science Foundation. The government has certain rights in this invention.

FIELD OF THE INVENTION

The present invention is directed to improvements in the formation of polymeric microcellular and supermicrocellular foamed materials. Interest in microcellular materials has grown steadily over the last few years, especially since microcellular polymers have tremendous potential for industrial application. Their physical properties are significantly improved compared with conventional polymer foams and in some cases the substitution of pure polymers by microcellular polymers is possible.

INFORMATION DISCLOSURE

The Inventors wish to cite the following references as background information related to this invention:

Cha, et al. U.S. Pat. No. 5,158,986 "Microcellular Thermoplastic Foamed with Supercritical Fluid"

Cha, Sung Woon, "A Microcellular Foaming/Forming Process Performed At Ambient Temperature and a Supermicrocellular Foaming Process" Ph.D. Thesis, MIT, Cambridge, Mass., 1994.

Baldwin, D. F., "Microcellular Polymer Processing and the Design of a Continuous Sheet Processing System," Ph.D. Thesis, Massachusetts Institute of Technology, Cambridge, hMass., 1994

Collias, D. J. and Baird, D. G., "Does a Microcellular Structure Improve the Modulus of Toughness of a Polymer Matrix," Society of Plastics Engineers Technical Papers, Vol. 38, pp. 1532–1535, 1992

Crank, J., The Mathematics of Diffusion, Clarendon Press, Oxford, pp. 203–253, 1975

Domininghaus, H., Die Kunststoffe und ihre Eigenschaften, Vol. 4, VDI Veriag, Duisseldorf. p. 847, 1992, (in German)

Durril, P. L. and Griskey, R. G., "Diffusion and Solution of Gases in Thermally Softened or Molten Polymers: Part 1, " A. I. ChE. Journal, Vol. 12, pp. 1147–1151, 1966

Durril, P. L. and Griskey, R. G., "Diffusion and Solution of Gases in Thermally Softened or Molten Polymers: Part II," A.I Ch.E. Journal, Vol. 15, pp. 106–110, 1969

Fritz, H. G., "Kunststofftechnologie—Einfiihrüng und Grundlagen, " Institut für Kunststofftechnologie der Universität Stuttgart (IKT), Stuttgart (in German)

Fritz, H. G., "Kunststoffverarbeitung I," Institut fur Kunststofftechnologie der Universität Stuttgart (IKT), Stuttgart (in German)

Herrmann, T., "Extrusion of Microcellular Plastics: Design Issues for Implementation and Scale-up," Thesis/Studienarbeit, University of Stuttgart, Stuttgart, 1994

Krevelen, D. W. Van, Properties of Polymers, Elsevier, N.Y., pp. 404–425, 1976

Koros, W. J. and Paul, D. R., "Sorption and Transport of $CO_2$ Above and Below the Glass Transition of Poly(ethylene terephthalate)," Polymer Engineering and Science, Vol. 20, pp. 14–19, 1980

Martini-Vvedensky, J. E., Suh, N. P., and Waldman, F. A., "Microcellular Closed Cell Foams and Their Method of Manufacture," U.S. Pat. No. 4,473,665 (1984)

Newitt, D. M. and Weale, K. E., "Solution and Diffusion of Gases in Polystyrene at High Pressures," Journal of Chemical Science, Part 11, pp. 1541–1549, 1948

Park, C. B., "The Role of Polymer/Gas Solutions in Continuous Processing of Microcellular Polymers," Ph.D. Thesis, Massachusetts Institute of Technology, Cambridge, Mass., 1993

Rabinowitsch, B., "Über die Viskosität und Elastizität von Solen", Zs. Phys. Chemie., Vol. 145, p. 1/26, 1929, (in German)

Seeler, K. A. and Kumar, V., "Fatique of Notched Microcellular Polycarbonate." Cellular Polymers, MD-Vol. 38, ASME. pp. 93–108, 1992

Seeler, K. A. and Kuxnar, V., "Tension-Tension Fatique of Microcellular Polycarbonate: Initial Results." Journal of Reinforced Plastics and Composites, Vol. 12. pp. 359–376, 1993

Suh, N. P., "Microcellular Plastics," Innovations in Polymer Processing (Ed. by J. Stevensen), 1995

Weissenberg, K., Eisenschitz, R., and Rabinowitsch, B., Mitt. der Deutschen Materialprüfungsanstalt, special Vol. 8, p. 91 ff., 1929, (in German)

BACKGROUND OF THE INVENTION

In general, foamed polymers are materials which have a cellular structure, which means gas filled cells are embedded in the polymer matrix. These cells can be isolated from each other, (closed cell foam), or they can have openings to each other, (open cell foam). Open and closed cell foams have mostly common properties, but they have also some different properties. The main difference is that the volume of the cells in open cell foams is accessible from the outside. Therefore, gaseous or liquid materials can penetrate the foam and can be stored and released again without damaging the foam itself. The open cell structure also allows this type of foam to be used as a filter, which prevents solid particles larger than the cell from passing through the foam.

Polymer foams have certain typical properties compared with the solid unfoamed polymer. They have a lower density, lower heat and electrical conductivity, and lower strength. The lower strength can be explained by the reduced amount of polymer per cross section.

There are different processes which can create polymer foams. The most important ones are Reaction Injection Molding (RIM), injection molding and foam extrusion. In Reaction Injection Molding the polymer is foamed by carbon dioxide which is released as a byproduct of the chemical reaction between the two monomers. In injection molding and foam extrusion, a blowing agent has to be added to the polymer. There are two types of blowing agents, chemical and physical blowing agents. Chemical blowing agents are solids which decompose at elevated temperatures. The decomposition products are normally a mixture of gases and solid byproducts. Chemical blowing agents are normally blended with the polymer pellets in the form of a dry powder. This makes their use very convenient, because no change of the conventional extrusion or injection molding equipment is necessary.

Regardless of whether chemical or physical blowing agents are used, additional nucleation agents are needed to enhance nucleation of the gas bubbles in conventional foaming systems. The nucleating agents are normally solids with a very small diameter and are blended into the polymer pellets. To achieve a very uniform and homogeneous cell structure it is necessary to distribute the nucleation agents very uniformly throughout the polymer melt. The smallest cell size of polymer foams processed with these conventional methods is in the range of 100 $\mu$m. The corresponding cell density, which is defined as cells per cubic centimeter of the unfoamed material, is in the range of $10^3$ to $10^6$ cells per cubic centimeter.

Microcellular polymers are polymer foams with much smaller cell sizes than those of conventional polymer foams. They are generally defined as foams with cell sizes under 100 $\mu$m and cell densities on the order of $10^8$ and larger. Recently developed supermicrocellular polymers have even smaller cells and higher cell densities. Supermicrocellular polymers are defined by cell sizes smaller than 1 $\mu$m. The cell densities of these polymers are normally larger than $10^{12}$ cells per cubic centimeter. The smallest cell size which could be achieved so far is 0.1 $\mu$m which corresponds to a cell density of about $10^{15}$ cells per cubic centimeter.

Microcellular polymers have certain advantages over conventional foamed polymers. First, their cells are so small that they can not be seen by the naked eye. Therefore, the physical appearance equals that of the solid polymer. However, the microstructure lets them appear opaque and, if no color pigments are used, they appear white. Furthermore, the mechanical properties change significantly. They are much tougher, have increased specific mechanical strength and have a much longer fatigue life than the solid polymer (Collias and Baid, 1992: Seeler and Kumar, 1992, 1993). In addition, their cell structure and cell size distribution is much more uniform than that of the conventional foamed polymers, which results in generally much better properties than those of conventional polymer foams. The increase of the fatigue life of microcellular polymers can be explained by the huge amount of cells per cubic centimeter. The cells act as crack arresting sites. Therefore, microcracks are stopped at once and the chance that they result in fatigue fractures is reduced significantly.

Applications of microcellular and supermicrocellular polymers are many. Not only can they can replace mostly all of the conventional foams due to their better properties, they also fill niches for new applications which have not existed up until now. Another application is the substitution of the solid polymer with microcellular polymers so as to increase the fatigue life of the product, without significantly sacrificing the mechanical strength. This is possible due to very low cell expansion with minimal density increase. The large number of cells act as crack arresting sites which increase the fatigue life; nevertheless, the mechanical strength is still close to that of the original polymer because of the low volume expansion.

Another possible application is the development of transparent supermicrocellular foams. A requirement for this material is that the cells are much smaller than the wavelength of light, which is in the order of 0.05 $\mu$m.

A huge advantage of microcellular polymers is that their processing does not require the use of fluorochlorocarbons, which is very important from the environmental point of view. Environmentally safe gases like carbon dioxide or nitrogen are used for their processing.

All processing techniques for microcellular polymers have in common one fundamental process, which basically consists of three steps; (1) formation of a single-phase polymer/gas solution, (2) cell nucleation and (3) cell growth.

The first step in creating a microcellular polymer foam is the formation of a single-phase solution of polymer and gas. Two physical phenomena are involved in this process, the diffusion of the gas into the polymer and the attainment of thermodynamic equilibrium between the polymer and the gas. Under equilibrium conditions, a certain amount of gas is dissolved in the polymer. The solubility of a gas in a polymer is a strong function of the pressure and the temperature. It increases with pressure and decreases with temperature.

At the moment when the polymer is suddenly set under external pressure by a gas, the whole system of gas and polymer is in a thermodynamically unstable state. The gas starts diffusing into the polymer to increase the entropy of the system and to finally reach a new stable thermodynamic equilibrium state. The driving force for diffusion is therefore the Gibbs free energy. Solubility of gas in polymer is a function of pressure and temperature. The diffusivity D is a function of the temperature and increases with increasing temperature. The relation between diffusivity and temperature can be approximated by an Arrhenius equation:

$$D=D_0 e^{-\Delta G/kT}$$

where $\Delta G$ is the activation energy, k the Bolzmann's constant, and T the absolute temperature (Newitt and Weale, 1948: Duml and Griskey, 1966 and 1969; van Krevelen, 1976; Koros and Paul, 1980). This equation is valid only if the change in gas concentration in the gas/polymer system does not effect the diffusivity. In the case of microcellular polymer processing, the influence of the concentration change is not negligible, because the amount of gas dissolved in the polymer at equilibrium is on the order of six to ten percent by weight of the polymer (Park MIT Thesis, 1993).

The most essential step in creating microcellular polymers is the nucleation of the cells. Unlike conventional foam processing, no nucleation agents need to be used for the cell nucleation in microcellular polymer processing. Classical nucleation theories distinguish between homogeneous and heterogeneous nucleation. Throughout a homogeneous matrix the activation energy required for nucleation is totally uniform. Therefore, nucleation itself occurs totally uniformly throughout this matrix. Heterogeneous nucleation occurs at interfaces of two or more different materials or at the interfaces of the different microstructures of one material, e.g., amorphous and crystalline phase in semi-crystalline polymers. At these interfaces the interfacial energy is high and as a result the activation energy required for nucleation is low.

The driving force for nucleation in microcellular polymer processing is the supersaturation of the polymer due to the rate of changes in pressure or temperature. As demonstrated by Park (1993), Baldwin (MIT Thesis,1994), and others in extrusion processing, microcellular nucleation rates are created when solubility levels change at rates far above that of conventional extrusion foaming. These solubility rate changes are caused by thermodynamic instabilities of either pressure drop (Park) or temperature rise (Baldwin).

The polymer/gas single-phase solution was at a stable equilibrium state at high pressure. The high rates of drop in pressure or the rates of increase in temperature change the solubility of the gas in the polymer very rapidly which is a very large driving force. The difference in the activation energy level for homogeneous and heterogeneous nucleation is small in comparison to the energy available for nucleation. It exceeds the energy required for heterogeneous nucleation and also allows for homogeneous nucleation simultaneously. The higher the degree of supersaturation, the higher is the degree of homogeneous nucleation, independent of the number of heterogeneous nucleation sites. For that reason no nucleation agents are needed. For a more detailed discussion of classical and newer nucleation models for microcellular polymer processing, refer to Baldwin (1994), Park (1993).

Nucleation alone however, does not create a microcellular structure. The third and most difficult to control step in microcellular polymer processing is cell growth. Right after the nucleation of a cell the pressure in the nucleus is equal to the saturation pressure (Suh, 1995). Therefore, the bubble tries to expand. The expansion is constrained by the surface tension of the bubble. The internal pressure of the bubble and the surface tension of the bubble determine the size of the cell at equilibrium condition. The cell grows only if the polymer matrix is soft enough to allow expansion. During cell growth, gas diffuses out of the polymer matrix and into the bubble. Since the amount of cells nucleated in microcellular polymer processing is very large, the amount of gas has to be distributed among all the nucleation sites. Therefore, the amount of gas available for each cell is very small, which results in very small cell sizes.

The basic process for microcellular polymers can be applied to several processing techniques, including batch processing and extrusion processing. During batch processing a polymer sample is placed in a pressure chamber and the chamber is pressurized with a gas. The gas saturates the sample as it diffuses into it. The time required to saturate the sample depends on the thickness of the sample, the gas pressure, and the temperature, and is in the order of minutes to days. Once the sample is saturated completely, the gas is released quickly, to cause nucleation. The conditions for cell growth depend strongly on the type of polymer and the polymer itself. Some polymers foam at room temperature while other polymers need to be heated to much higher temperatures to enable cell growth. In general, foaming temperatures lie in the range of the glass transition temperature ($T_g$) of the polymer/gas solution using amorphous polymers. Note that the glass transition temperature of the single-phase solution of gas and polymer is significantly lower than the glass transition temperature of the neat polymer. This is due to the softening effect of the gas in the polymer matrix. (Cha thesis).

This effect (drop in Tg) and others, characteristic of high saturation levels of $CO_2$ or other supercritical blowing agents, upon processing conditions has been discussed in Park (1993).

Semicrystalline polymers, however, require foaming temperatures around the melting point ($T_m$) of the crystalline areas in the polymer matrix. If the polymer matrix in these areas is not soft enough only the amorphous regions are foamed, resulting in fewer and therefore bigger bubbles.

The basic microcellular polymer process can also be incorporated in an extrusion process. The extrusion equipment necessary consists basically of four physical units. There is the extruder which plasticates conventional polymer pellets. The gas is injected directly in the polymer melt flow of the extruder by a gas metering system. Mixing and homogenizing sections of the extruder screw create the single-phase solution of the polymer and the gas. Additionally, the extruder creates the pressure required for a high gas solubility, the key issue for a high nucleation rate. Nucleation is achieved by a nucleation device at the end of the extruder. The original nucleation device used by Park (1993) was a single-orifice nozzle which utilized a rapid pressure drop for cell nucleation (see FIG. 1). The pressure drop was achieved by the viscous flow of the polymer/gas solution through the nozzle. One limitation of the nozzle pressure drop device was very low flow rates. Later, near net shape nucleation was investigated by Baldwin (1994), which showed that only limited product qualities could be achieved. Cell sizes with nozzle and near net shape nucleation were in the range of 10 $\mu$m. The bubbles were sheared in extrusion direction which resulted in nonuniform product properties.

SUMMARY OF THE INVENTION

To improve the microstructure and the overall quality of continuously extruded material, in particular microcellular polymers, a new extrusion system was designed and implemented. The system is applicable to essentially any foamed material and finds particularly advantageous use in the creation of microcellular polymeric material. In contrast to all previous polymer foam extrusion systems, the extrusion system of the present invention employs a gear throttle which was installed to nucleate the microvoids. The gear throttle provides a uniform and very rapid pressure drop over a large cross section of flow, thereby allowing the nucleation and processing of parts with larger cross sections than those possible with nozzle nucleation. Since the gear throttle effects nucleation, it is alternatively referred to herein as a gear nucleator.

The experiments described herein reflect a significant improvement in the microcellular structure. The cell size could be reduced to as low as 0.1 $\mu$m and smaller combined with an increase in the cell density up to $1.56 \cdot 10^{14}$. This is also the first time that supermicrocellular polymers could be extruded continuously. Due to the small cell sizes, the bubbles were not sheared in the shear field of the die. This makes it possible to use virtually any preexisting extrusion die for plain polymers. Another advantage of the gear throttle is that the pressure drop can be selected independently of the flow rate, which would involve the change of the nozzle in previous systems.

Thus the present invention may be summarized as an improvement in microcellular or supermicrocellular polymer extrusion systems. Conventional systems employ an extruder which plasticates polymer pellets into a polymer melt; a gas metering system, whereby a gas is injected directly in the polymer melt flow in the extruder; a mixing and homogenizing section of the extruder, which creates a single-phase solution of the polymer and the gas; and a nucleation device at the outlet end of the extruder. In this invention, the improvement to the conventional system comprises the nucleation means attached to said extruder that produces greater advantageous pressure drop rates, which translates to smaller cells and greater cell nucleation densities. In one embodiment the invention involves gear pump acting as a nucleator and throttle rather than a pump. With this improvement, the discharge pressure is dictated by die resistance and flow rate as delivered by the gear throttle, and the pressure drop of the polymer/gas single-phase solution reaches advantageous levels.

Figure 1:
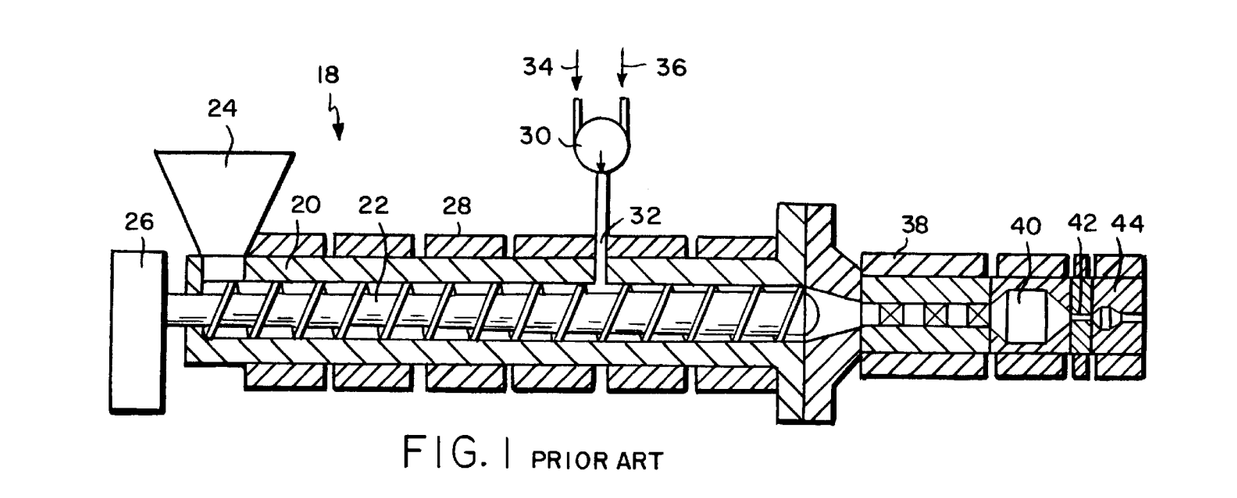
FIG. 1 illustrates the prior art microcellular extrusion system utilizing nozzle nucleation.

The gear nucleator successfully nucleates supermicrocellular polymers. Cell sizes were by at least one order of magnitude smaller and cell densities up to about five orders of magnitude larger than in any previously used continuous process for microcellular polymers. The smallest cells previously produced, with an average diameter of 5 $\mu$m and the previously highest cell density, of $6 \cdot 10^9$ cells per cubic centimeter, were achieved by the microcellular polymer extrusion process using nozzle nucleation (Park, 1993). No visible effect of the gear teeth of the gear throttle on the microstructure could be detected. The Park extrusion system is illustrated in FIG. 1.

Based upon the results achieved with the extrusion system of the present invention, one can expect much higher cell densities and much smaller cell sizes by the nucleation of a pure single-phase solution with higher saturation pressure. The gear nucleator was able to nucleate large cross sections which is essential to produce large articles at advantageous flow rates. Furthermore, it seems that the surface tension of the small cells is large enough that they do not get deformed during their way though the die.

Another advantageous modification in this invention was the use of a "grooved" extruder. The use of such an extruder provided much higher pressures over previously used extruders. With higher pressures, the solubility of gas in the polymer can be increased. Furthermore, larger pressure drop rates, resulting in higher nucleation rates. In comparison with a conventional extruder the high pressure is already available at the gas injection port, which reduces diffusion time drastically. Additionally, better mixing elements can be used, which would result in too large pressure losses in conventional extruders. The high pressures do not sacrifice low melt temperatures like it would be the case in a conventional extruder. Therefore, cooling of the polymer/gas single-phase solution, which is necessary to maintain the melt viscosity, is much less crucial than in a conventional polymer foam extrusion system.

However, a novel feature of this invention is tLile use of a gear nucleator to achieve the higher pressure drop rates of this system. In conventional extrusion this device is known as a gear pump and is used to maintain a very precise volumetric flow rate of the polymer for high precision applications. In conventional processes, the gear pump does most of the pressure build-up and therefore relieves the extruder. The extruder can now deliver a higher flow rate, because it does not work against high pressure any more.

With the microcellular polymer extrusion system of the present invention, the gear pump is used in a totally new way. It acts as a nucleator and a throttle rather than a pump. A pressure controller is used to maintain a very high pressure on the suction side of the gear throttle by controlling the rpm of the extruder. The discharge pressure is dictated by the die resistance and the flow rate which is delivered by the gear throttle. One advantage of this arrangement is that the pressure drop rate of the polymer/gas single-phase solution is increased which results in much higher nucleation rates and therefore smaller cell sizes than could be achieved with prior microcellular nozzle nucleation. Furthermore, nucleation takes place over a large cross section, which enables scale-up and the use of industrial sizes of extrusion dies.

One aspect of the invention involves a method for foaming material that involves establishing an elevated pressure stream of a fluid mixture of a precursor of foamed material admixed homogeneously with a blowing agent. The fluid mixture is essentially free of gaseous cells and nuclei of gaseous cells. The stream of the fluid mixture is advanced at a rate of flow, and the blowing agent is continuously nucleated by successively isolating successive portions of the stream at the elevated pressure and successively nucleating each of the successive portions by subjecting each separate portion to thermodynamic instability in releasing each successive portion into a region of pressure lower than the elevated pressure. The successive portions then are combined to define a homogeneous nucleated stream, which can be maintained in an unfoamed state until foaming at a later stage.

In one aspect the method is embodied in a system for producing foamed material, such as microcellular foamed polymeric material. The system includes an extruder having an inlet, at an inlet end, and an outlet, at an outlet end. The inlet is designed to receive a precursor of foamed material and the outlet is designed to release foamed material from the extruder. An enclosed passageway connects the inlet with the outlet. The passageway is constructed and arranged to receive a blowing agent and to contain a homogeneous mixture of the blowing agent with material to be foamed in a fluid state, at an elevated pressure, and to advance the mixture as a fluid stream within the passageway in a downstream direction, that is, from the inlet end toward the outlet end. A gear nucleator is associated with the passageway and includes a fluid channel that forms part of the passageway. The gear nucleator is constructed and arranged to rotate in a downstream direction while maintaining the mixture in a region upstream of the nucleator at a pressure higher than the mixture in a region downstream of the nucleator. That is, the wheels of the gear nucleator rotate such that the teeth of the gears move in a downstream direction in the fluid stream and create a pressure drop across the gear nucleator.

The invention also provides a method of mechanically controlling the flow rate of an microcellular extrusion system. The method involves establishing a stream of a fluid mixture of a precursor of foamed material admixed homogeneously with a blowing agent in an extruder passageway. The fluid mixture is established at a particular rate of flow, and flows in a downstream direction from an inlet end of the passageway toward the outlet end of the passageway. The rate of flow of the fluid mixture is controlled by obstructing the passageway completely with a wall, causing the wall to more in a downstream direction within the passageway, and reopening the passageway by removing the wall.

The invention also provides a method of relating the flow rate of a fluid stream in an extruder to the rate of injection of a blowing agent. The method involves establishing a stream of a fluid mixture of a precursor of foamed material admixed homogeneously with a blowing agent by delivering the blowing agent into the stream at a particular rate of delivery. The stream is advanced at a particular rate of flow and the precursor is continuously foamed by allowing the blowing agent to expand and foam the material. The rate of delivery of the blowing agent is metered in relation to the rate of flow of the stream so that the blowing agent can be maintained essentially at its saturation level in the mixture.

According to another aspect, the relation of flow rate of the fluid mixture to delivery rate of the blowing agent is embodied in a system. The system includes an extruder passageway having an inlet and an outlet and a blowing agent conduit comnected to an orifice of the passageway between the inlet and the outlet. The blowing agent conduit is connectable to a source of blowing agent. The extruder includes a mechanism for advancing a fluid stream within the passageway in a direction from the inlet toward the outlet, the mechanism having an adjustable speed. A meter is associated with the conduit that is capable of controlling a rate of delivery of the blowing agent to the enclosed passageway. The system includes a controller operably linked to the meter and operably linked to the mechanism for advancing the fluid stream that is capable of maintaining the rate of delivery of the blowing agent in a predetermined relation to the rate of flow of the fluid stream. As in the above-noted method, the system allows for maintaining the blowing agent essentially at its saturation level in a fluid mixture of foamed material precursor within the passageway. In one embodiment, the meter is responsive to the speed of operation of the mechanism for advancing the fluid stream.

The invention also provides a method of making cellular material having particularly small cell dimensions. The method involves continuous extrusion resulting in closed-cell microcellular material having regions of cell density of at least about $10^{10}$ cells/cc. The method involves establishing an elevated pressure stream of a fluid mixture of a foamed material precursor admixed homogeneously with a blowing agent, the fluid mixture being essentially free of gaseous cells and nuclei of gaseous cells. The blowing agent is continuously nucleated by subjecting the fluid mixture to thermodynamic instability at a region through which the stream passes to continuously produce a nucleated mixture. Then, the fluid mixture is subjected to pressure and temperature conditions that create a closed-cell microcellular material having regions of cell density of at least about $10^{10}$ cells/cc.

The invention also provides a screw design for an extruder. The screw forms a part of a system for producing foamed material including an extruder having a barrel within which the extruder screw is mounted for rotation. The extruder screw has flights arranged to advance a foamed material precursor within the barrel toward the outlet of the extruder upon rotation of the screw. The screw also includes a mixing region defined by at least one protrusion auxiliary to the flights. The extruder includes a blowing agent inlet fluidly connected to the barrel which is proximate a position of the screw that is separated from the mixing region by no more than four flights at any rotational position of the screw. In another embodiment, the inlet is proximate a position separated from the mixing region by no more than two flights, and in another embodiment separated from the mixing region by no more than one flight. In a further embodiment, the screw is free of an interrupted flight proximate the inlet.

The invention also provides a system for producing foamed material including an extruder that can be shorter than expected based upon required physical characteristics. The system includes an extruder having an inlet, an outlet, and an enclosed passageway connected the inlet with the outlet. The enclosed passageway includes an interior surface having grooves formed in the surface. This allows a single-extruder system to be operated within reasonable, commercially-feasible length to diameter ratios. In particular, the systems and methods of the invention can be carried out using a single-extruder system if desired. A multi-extruder system can be used.

The invention also provides a method including extruding a microcellular article from a wire coating extruder. Also provided is a microcellular article in the form of a tube.

In all of the methods and systems described, a blowing agent that is made supercritical in the extrusion apparatus can be used, as well as a blowing agent introduced into the apparatus in a supercritical state. In the systems and methods, according to preferred embodiments, microcellular or supermicrocellular material is produced.

Other advantages, novel features, and objects of the invention will become apparent from the following detailed description of the invention when considered in conjunction with the accompanying drawings which are schematic and which are not intended to be drawn to scale. In the figures, each identical or nearly identical component that is illustrated in various figures is represented by a single numeral. For purposes of clarity, not every component is labeled in every figure.

DETAILED DESCRIPTION OF THE PREFERRED EMBODIMENT

Referring to FIG. 1, a prior art extrusion system 18 is illustrated schematically and includes an extruder barrel 20 in which is mounted a screw 22. A hopper 24 delivers material to be foamed to an inlet end of the barrel and a motor and drive gear 26 drives the screw rotationally within the barrel. A temperature conditioner 28 is provided along the barrel, typically to heat material within the barrel. A high pressure pump 30 is provided to deliver, under pressure, one or more blowing agents into the barrel via an orifice 32 from one or more supply conduits 34 and/or 36.

Typically, thermoformable polymer pellets are provided in hopper 24, screw 22 is rotated, and the pellets are driven in the barrel from the inlet end toward the outlet end of the extruder. Heat from temperature conditioner 28, in combination with heat generated by frictional shearing forces, causes the pellets to melt and a fluid stream of molten polymeric material is driven through the barrel by the screw. The molten material is admixed with propellant from orifice 32 and delivered into a static mixer 38 at which further mixing of the polymeric material with the blowing agent occurs. A chamber 40 can be provided optionally. The polymeric material/blowing agent mixture is forced through a nozzle 42 in which a pressure drop rate occurs which causes microcellular nucleation and foaming of the material. The material then can pass into a shaping dye 44 at which the material is shaped.

Figure 2:
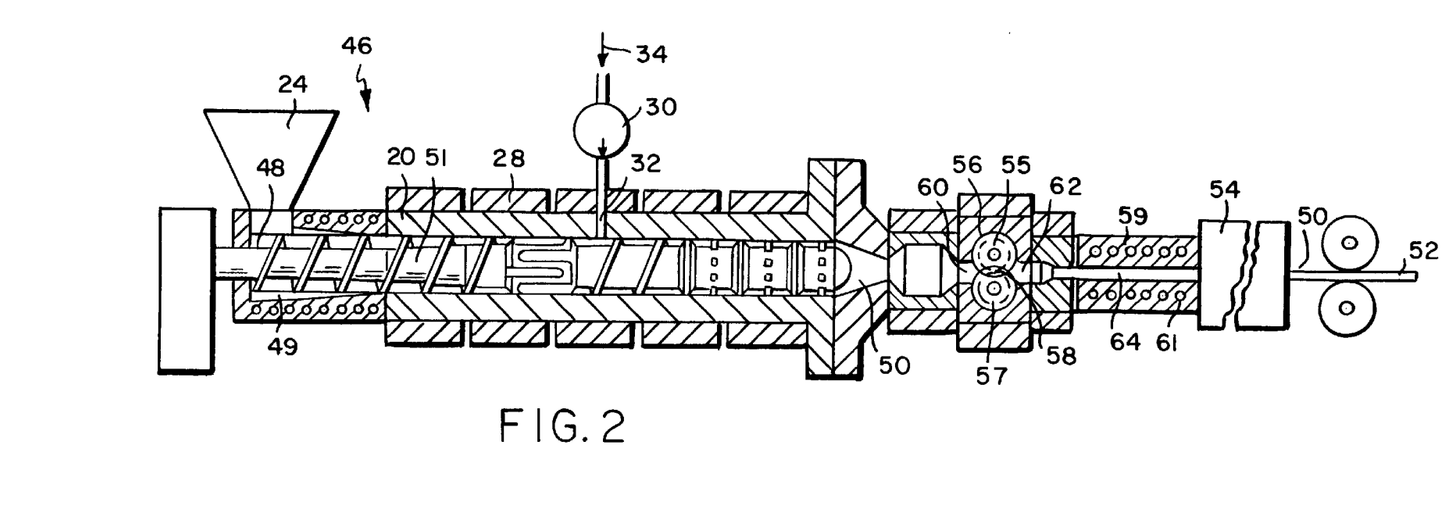
FIG. 2 illustrates the preferred embodiment of the microcellular extrusion system of the present invention.

Referring now to FIG. 2, a system 46 that defines one embodiment of the present invention is illustrated. The system includes an extruder barrel 20 having an inlet 48 and an outlet 50. The barrel forms part of an overall extruder fluid passageway having an inlet end corresponding to inlet end 48 of the barrel, and an outlet end 50.

The inlet end 48 of the passageway is designed to receive a precursor of foamed material such as pellets of polymeric material via hopper 24. As used herein, "precursor of foamed material" is meant to define any material that can be provided in a fluid state and form at least a part of a final foamed product via a change in state and/or chemical reaction. Preferably, the precursor is polymeric stock material that can be melted in the extruder and foamed, for example a polyolefin such as polyethylene, polypropylene, or polyvinyl chloride, etc. The precursor also can be defined by a species that takes part in a chemical reaction resulting in a final foamed product, such as a precursor of a thermoset polymer.

The passageway is constructed and arranged to receive a blowing agent. The blowing agent preferably is any species that is a gas under ambient conditions and can be provided in a gas, fluid, or supercritical fluid state to the extruder barrel. Suitable blowing agents are apparent to those of ordinary skill in the art and include, for example, volatile hydrocarbons, chlorofluorocarbons, carbon dioxide, nitrogen, and the like. The blowing agent preferably is a supercritical fluid and, in particular, supercritical carbon dioxide. Supercritical carbon dioxide (or other supercritical fluid) can be provided in a supercritical state into the extruder barrel or can be provided in a non-supercritical state and rendered supercritical by conditions within the barrel. Conditions for receiving and maintaining a blowing agent and creating a homogeneous mixture of the blowing agent with the precursor, including conditions creating supercritical blowing agent, and means for attaining these conditions, are known to those of ordinary skill in the art, as described by Cha, et al., U.S. Pat. No. 5,158,986, and co-pending, commonly owned U.S. patent application Ser. No. 08/147,789, filed Nov. 4, 1993 by Park, et al., entitled "Method for Providing Continuous Processing of Microcellular and Supermicrocellular Foamed Materials," both incorporated herein by reference. The blowing agent can be delivered into the barrel via an orifice 32 connected to a high pressure pump 30 which is supplied by a source 34 of the blowing agent. The location of the orifice can be selected such that a suitable minimum (but relatively high) pressure can be maintained throughout the remaining stages of the process. The mixture of the blowing agent, for example supercritical blowing agent, with the precursor is further mixed by shear forces created by a plurality of blades of the extruder screw. A downstream static mixture region (not shown) can be provided optionally to create further mixing, although an additional static mixture is not required in preferred embodiments of the present invention such as those employing a screw as described below with reference to FIG. 3.

A mechanism for advancing the foamed article precursor, and the mixture of blowing agent with foamed material precursor is provided. In a preferred embodiment, a screw 51 is mounted within the barrel for rotation therein and serves as a device to advance a fluid stream of the foamed material precursor in a downstream direction from the inlet end 48 of the system toward the outlet end 50. The screw will not be described further here but, according to a preferred embodiment, a uniquely-designed screw is described below with reference to FIG. 3. A screw is illustrated for purposes of simplicity, but the manner in which the fluid precursor stream is advanced downstream within the passageway is not important to the invention. The stream can be advanced using a conventional extruder screw, a screw as defined below with reference to FIG. 3, a gear pump, or the like.

The passageway is constructed and arranged to contain a homogeneous mixture of the blowing agent with the material to be foamed in a fluid state at an elevated pressure within the passageway. The elevated pressure is due to compression provided by rotation of the screw or other device. A temperature conditioner 28 can be used to heat the precursor, and the precursor and blowing agent are mixed within the passageway.

Formed in a portion of the passageway, according to preferred embodiments, are a series of grooves 49. The grooves serve to facilitate melting of thermoplastic polymer pellets, when a thermoplastic polymer is the precursor, by allowing the pellets to be trapped within the grooves and to be heated and compressed by the shearing force of the flights of screw 51. The grooves preferably run longitudinally in the passageway and decrease in depth toward the outlet end of the passageway. In the embodiment illustrated, the grooves are formed in the initial portion of the extruder barrel where pellets are introduced from hopper 24. Use of a grooved barrel is particularly advantageous in the case of the arrangement of the invention in which the screw includes a mixing portion just downstream from the blowing agent inlet (described below). This is because the grooved portion reduces the length of the barrel required for polymer fluidization, allowing more room for homogenizing with blowing agent where a standard-length barrel is used.

At the outlet end 50 of the system, an outlet such as a die arrangement releases a foamed material 52 from the extruder. If it is desirable to obtain a closed-cell foamed material 52 then temperature and pressure conditions should be adjusted such that the foamed material can withstand the pressure drop associated with emergence from the outlet of the extruder into atmosphere without a violent expansion. A die optionally combined with a cooler 54 can be provided to "freeze" partially or fully-foamed material prior to emergence into the atmosphere so that a closed-cell structure results. Additionally, the extruder should be designed such that the pressure drop upon emergence is not so great that the material expands unacceptably. An arrangement as described in the above-referenced application Ser. No. 08/147,789 abandoned also can be employed. A section 59 of the extruder preceding the die/cooler can include a series of channels 61 for containing a fluid at a predetermined temperature, such as a cooling fluid.

Between the inlet end and the outlet end 50 of the passageway, the fluid stream of foamed material precursor admixed homogeneously with blowing agent is nucleated by gear nucleator 56. The gear nucleator includes a first rotatable gear 55 and a second rotatable gear 57, each including teeth intermeshed with teeth of the other gear, the gears mounted for rotation about axes perpendicular to the fluid passageway. The teeth of the gears mesh in the fluid passageway and the fluid passageway cannot circumvent the teeth. The teeth are enmeshed in a manner such that voids in the enmeshed teeth are created, these voids defining a fluid channel 58 that forms a part of the fluid passageway of the system. The fluid channel 58 is discontinuous in that the voids formed between the teeth of the gear nucleator define separate, isolated enclosures.

Gear nucleator 56 can be defined by a conventional gear pump but is operated differently. A gear pump is mounted for rotation in a direction of higher pressure. The invention can utilize a conventional gear pump that is arranged in the system such that the pressure differential across the pump is opposite that of the pressure differential across a gear pump as constructed and arranged conventionally. A gear pump, conventionally, is arranged in a fluid passageway and positively driven such that fluid enters the fluid channel of the gear pump at a first pressure and exits the fluid channel into a region of a second pressure higher than the first pressure. That is, the gear pump drives fluid forward from a region of lower pressure into a region of higher pressure. In the present invention, a gear nucleator is provided which operates in a manner similar to a conventional gear pump with the exception that rather than driving a fluid from a region of lower pressure into a region of higher pressure, it is constructed and arranged to allow a fluid to pass from a region of higher pressure into a region of lower pressure thereby creating a controlled pressure drop rate across the gear nucleator. The gear nucleator can be defined by a conventional gear pump that is braked rather than driven, or a conventional gear pump the speed of which is controlled by a motor (as in a conventional gear pump) but in which the speed of the motor is adjusted to provide a region downstream of the gear nucleator of pressure lower than the pressure upstream of the gear nucleator. That is, the gear nucleator of the invention is arranged such that the teeth rotate in a direction towards a region of lower pressure and the gear pump thereby opposes the flow of fluid and creates a pressure drop. Gear nucleator 56 rotates in a downstream direction towards outlet end 50 (that is, the teeth move within the fluid passageway toward outlet end 50) but a region 60 of higher pressure exists upstream of the teeth (fluid channel of the gear nucleator) and downstream of the gear nucleator is a region 62 of lower pressure.

The gear nucleator is operably linked to a speed control capable of maintaining a speed of rotation of the nucleator at a rate creating a predetermined pressure drop in the fluid stream across the gear nucleator. The speed control can be a brake, a motor the speed of which is controlled, a combination of these, or the like. As such, the gear nucleator defines a mechanical flow rate controller, in contrast to typical conventional extruders in which flow rate is determined by a combination of viscosity of molten polymeric material and the size of an orifice through which the polymeric material is forced to pass. In the present invention, discrete, isolated containers defined by voids in the intermeshed teeth of the gear nucleator transport fluid material from upstream region 60 to downstream region 62 at a rate that is controlled by the speed of rotation of the gear nucleator and that is independent of the viscosity of the fluid. The gear nucleator can achieve a flow rate of at least 180 cc/min.

System 46 provides apparatus that can be used in a method of the invention that involves establishing an elevated pressure stream of a fluid mixture of a precursor of foamed material admixed homogeneously with a blowing agent in the barrel, then nucleating and foaming the material. By "elevated pressure" it is meant that the fluid stream is subjected to, and maintained at, a pressure higher than the pressure of the environment into which the foamed material product is finally released from the extruder. Typically, of course, this means a pressure significantly higher than atmospheric pressure, generally in the range of from about 500 psi to about 6,000 psi. The fluid mixture is typically a solution of the foamed material precursor and the blowing agent in fluid or supercritical fluid form. A supercritical fluid blowing agent is preferred and, when combined with the foamed material precursor in the extruder, a solution is formed. The method involves advancing the stream at a rate of flow. The stream can be advanced at a controlled rate by rotation of screw 51 or, in an alternate embodiment, by urging the fluid stream toward the outlet end using another device such as a gear pump.

The blowing agent admixed with the material to be foamed then is continuously nucleated. By "continuously" it is meant that the advancing stream passes through a region through which conditions to which the stream is subjected change. The gear nucleator of the invention is such a region. When a stream of molten polymeric material admixed homogeneously with a blowing agent such as a supercritical fluid passes through the gear nucleator, the blowing agent is continuously nucleated as the stream passes through the nucleator. Since the gear nucleator includes enmeshed teeth of separate gears that define separate, isolated containers between the teeth, the method involves successively isolating successive portions of the fluid stream at the elevated pressure of region 60 upstream of the gear nucleator, and successively releasing each isolated portion of the stream into a region of pressure lower than the elevated pressure (at downstream region 62). The technique results in microcellular or supermicrocellular material that does not contain discrete partitions resulting from the separation and recombination of the stream. As used herein, "microcellular" refers to foams with cell sizes under 100 $\mu$m and cell densities on the order of $10^8$ and larger. Preferably, microcellular foams have cell sizes under 10 $\mu$m and cell densities on the order of $10^9$ and larger. The present invention provides closed-cell microcellular and supermicrocellular foamed material, according to one embodiment, having cell densities greater than about $10^{10}$. In a preferred embodiment, the cell densities achieved are greater than about $10^{11}$, more preferably greater than $10^{12}$, more preferably greater than $10^{13}$, and in a most preferred embodiment the cell densities are greater than about $10^4$. Portions of the microcellular material produce in accordance with the invention have average cell sizes of less than 1.0 $\mu$m. Portions also can have cells as small as 0.5 $\mu$m, and in some embodiments portions have cell sizes smaller than 0.1 $\mu$m. No permanent memory of the teeth of the gear nucleator is impressed upon the final product. In region 62 the successive portions are combined to define a homogeneous, nucleated stream. The continuous, nucleated stream then can be processed in any manner useful in continuous extrusion. As illustrated in FIG. 2, as an example, a fluid passageway section 64, downstream of the gear nucleator, defines a sizing die that feeds into cooler 54.

The gear nucleator of the invention, when its teeth become enmeshed during rotation, creates a wall in the fluid passageway that obstructs the passageway completely. The wall defined by the enmeshed teeth is caused to move in a downstream direction within the passageway by rotation of the gear nucleator, and when the teeth become unmeshed from each other the passageway is reopened by way of removal of the wall.

Experiments conducted in connection with the present invention were conducted on a wire extruder in the absence of wire. Microcellular polymeric material was extruded in the form of a tube.

Figure 3:
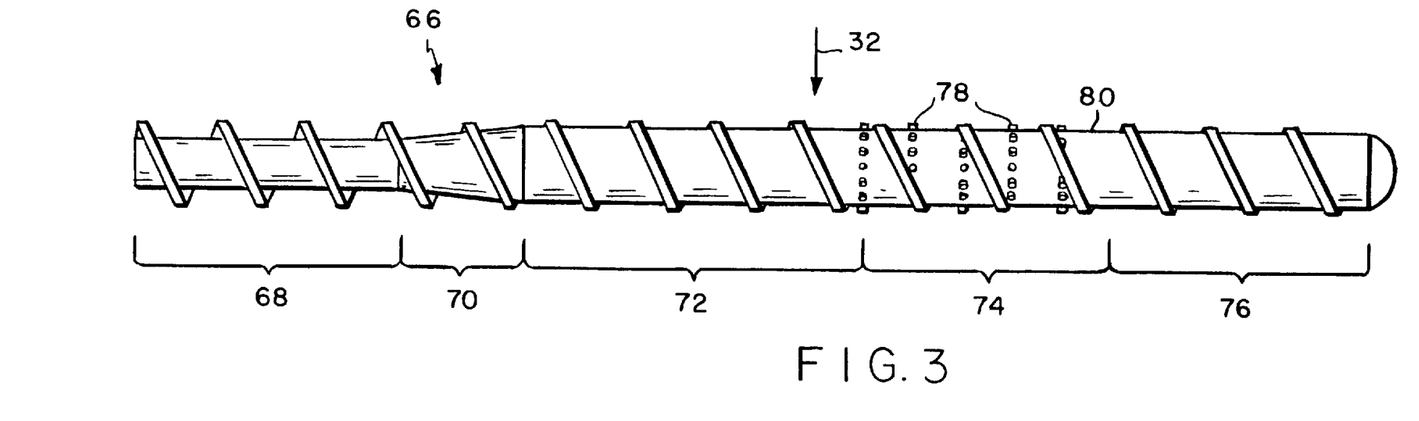
FIG. 3 illustrates the preferred screw employed in the microcellular extrusion system of the present invention.

Referring now to FIG. 3, a screw design of the present invention, particularly useful in extrusion of microcellular and supermicrocellular materials, is illustrated. As with conventional screws, the screw 66 includes a feed section 68, a transition section 70, and a metering section 72. One aspect of the invention involves a mixing section 74 and the positioning of a blowing agent injection orifice 32 relative to the mixing section. It has been found in accordance with the invention that positioning the blowing agent injection section just upstream of the mixing section is advantageous. In one embodiment, the screw is positioned in the extruder barrel such that the orifice, or inlet 32, is proximate a position of the screw separated from the mixing region 74 by no more than four flights at any rotational position of the screw. In another embodiment, the orifice is separated from the mixing region by no more than one or two flights, and in yet another embodiment the orifice is separated from the mixing section by no flights.

The mixing section includes, in addition to the screw flights, at least one protrusion and, typically, a plurality of protrusions 78. These protrusions that are in addition to and positioned between the flights, serve to thoroughly mix the fluid stream. The protrusions typically are defined by small, essentially cylindrical protrusions that extend from the bore 80 of the screw almost as far as do the flights. The mixing region can include any set of elements known to create enhanced mixing in an extruder screw arrangement. The particular mixing elements are not important, but the invention lies in placement of the mixing region relative to the blowing agent inlet.

The screw illustrated includes a second metering section 76 downstream of mixing section 74.

A conventional extrusion system was donated to MIT by Precision Interconnect of Portland, Oreg. This conventional wire system was originally designed for wire coating with conventional solid polymers. In order to accomplish this invention, the donated system was first set up, and then modified as described in detail below, including installation of the gear throttle, complete wiring of the controls of extruder and gear throttle, designing and machining of flanges and adapters, design and installation of a gas metering system and of a water circulation and cooling system. See FIGS. 2–4 accompanying this disclosure.

1. The Extruder

The donated extrusion system was designed and manufactured by Royle & Sons in 1986. It contains a one inch extruder with a smooth barrel. The L/D ratio is 30 to 1. The extruder barrel has a gas injection port at 16.5 D from the hopper. The extruder was designed for wire coating of very fine computer wires. The flow rates for this type of application are very low.

2. The Screw

The screw of the donated extruder was replaced by a screw (see, FIG. 3) specially designed for the microcellular polymer process and was manufactured by Davis Standard. Since the donated extrusion equipment was already fitted with a gas injection port at 16.5 D, it was just optimized for this special extruder and was not intended to be an ideal screw for the microcellular polymer extrusion process. The length of the different zones of the screw were given by the author.

The following design criteria had to be fulfilled to make the screw suitable for the microcellular polymer extrusion process:

(a) The gas injection port is fixed at 16.5 D.
(b) Intensive mixing at and immediately after injection to achieve a single-phase solution of polymer and gas.
(c) High saturation pressure.
(d) Increase of the pressure as much as possible before the gas injection port for the following reasons. First, the solubility of the gas in the polymer is a function of the pressure. Therefore diffusion time can be decreased by having a high solubility right at the gas injection port. The second reason is that mixing consumes a lot of the pressure and third the viscosity of the single-phase solution drops significantly compared with the plain polymer. Therefore, pressure cannot be built up as easy as with plain polymer after the gas injection port.
(e) Pure melt without unmolten polymer particles at the gas injection port.
(f) continuously flighted over the whole length.

For calculations, the screw and barrel have the following, effective geometric parameters:

D=25.4 mm (outer diameter)
L/D=30
t=D=25.4 mm (lead)
e=3.03 mm (flight width parallel to screw axis)
$\phi_a$=17.66° (pitch angle at outer diameter)

3. Feed Section
(a) $h_f$=5.28 mm (channel depth)
(b) $L_f$=6.5D=165.1 mm (length of straight feed section)
(c) $\phi_m$21.89° (pitch angle at half channel depth)
(d) $\phi_r$=28.58° (pitch angle at root diameter)

4. Transition Section
(a) $h_T$=variable (channel depth)
(b) $L_T$=3D=76.2 mm (length of transition zone)
(c) $\phi_m$=20.28° average pitch angle at half channel depth)

5. Metering Section
(a) $h_M$=1.47 mm (channel depth)
(b) $L_M$=20.5D=520.7 mm (length of metering section)

(c) $\phi_m$=18.67° (pitch angle at half channel depth)
(d) $\phi_r$=19.80° (pitch angle at root diameter)

Additionally, pin rings are located at 17.7 D, 18.9 D, 20.1 D, 21.3 D, and 22.5 D to enhance mixing. Each pin ring consists of nine pins spaced on a twelve hole index. The pins are 3.15 mm in diameter and extend from the root diameter of the screw to its outer diameter. This configuration separates the metering section into three subsections, the first metering section, the mixing section and the second metering section.

Two things are important to know for the operation of the extrusion setup. First, is the polymer totally molten at the gas injection port at operation conditions? And second, how high is the pressure build-up in the metering section and the pressure drop in the mixing section of the screw?.

The solid bed length was calculated as discussed below. Since no data is available at this time on the flow behavior of polymer/gas single-phase solutions at elevated pressure, it is not possible to perform the calculation to predict the pressure distribution along the extruder. However, below there is a setup proposed which is capable of determining the needed rheological data of polymer/gas solutions.

A simplified model of the plastication process (Fritz) was used to calculate the solid bed length and the solid bed profile. The main simplifications and assumptions are the following:

(a) unwound flat channel
(b) rectangular cross section
(c) stationary process
(d) coherent homogeneous solid polymer bed
(e) melt film only between barrel wall and solid bed
(f) melt film thickness constant and thin
(g) pure drag flow in melt film
(h) Newtonian flow behavior in the melt film The calculation was done for low density polyethylene (PE-LD) Lupolen 1800 H. The following process parameter were used, since they represent the actual processing conditions:

(a) n=28 min$^{-1}$ (screw rpm)
(b) G=20 cm$^2$/min (volumetric flow rate given by gear throttle)
(c) $T_B$=160° C. (barrel temperature)
(d) $T_s$=112° C. (screw temperature, assumed)
(e) $T_P$=30° C. (polymer pellet temperature)
(f) $P_i$=18.6 MPa (inlet pressure at the gear throttle)

If one assumes that the plastication starts 5.5 D from the feed opening edge, one can calculate the solid bed profile up to the beginning of the transition zone:

$$X/b = (1 - 0.0346 \cdot z)^2$$

Where X/b is the dimensionless width of the solid bed perpendicular to the channel wall, b is the channel width, and z is the coordinate parallel to the channel wall, starting from the first point of plastication. At the beginning of the transition zone with z=D=6.81 cm, this equation becomes:

$$X/b = 0.764$$

The solid bed length in the transition zone can be calculated as:

$$z_t = 19.83 \text{ cm}$$

which is 2.7 D in the direction of the screw axis. Since the transition zone is 3 D long, plastication is finished in this zone under these processing conditions. Even with respect to the simplifications it can be assumed that plastication is finished at the end of the transition zone during microcellular polymer processing, since the flow rate drops due to the lowered viscosity of the polymer/gas single phase solution. Additionally, the gear throttle inlet pressure is normally much higher which results in lower flow rates at the same screw rpm.

The dimensionless width of the solid bed in the transition zone can be calculated to be:

$$X/b = 0.764 \cdot [(2.427) - (1.427/\sqrt{1 - 0.335 \cdot z})]$$

Where z is the coordinate parallel to the channel wall starting from the beginning of the transition zone.

The original extrusion system was equipped by Royle & Sons with an injection system for Freon-22, but this injection system was never used by Precision Interconnect. The only component left was a diaphragm metering pump type FCM-1 by Lewa. Because diaphragm pumps have the ability to meter precise amounts of liquid at high pressures, this pump was modified for the microcellular polymer extrusion application to meter liquid carbon dioxide. The maximum pressure at the discharge side of the pump is 41.4 MPa.

Figure 4:
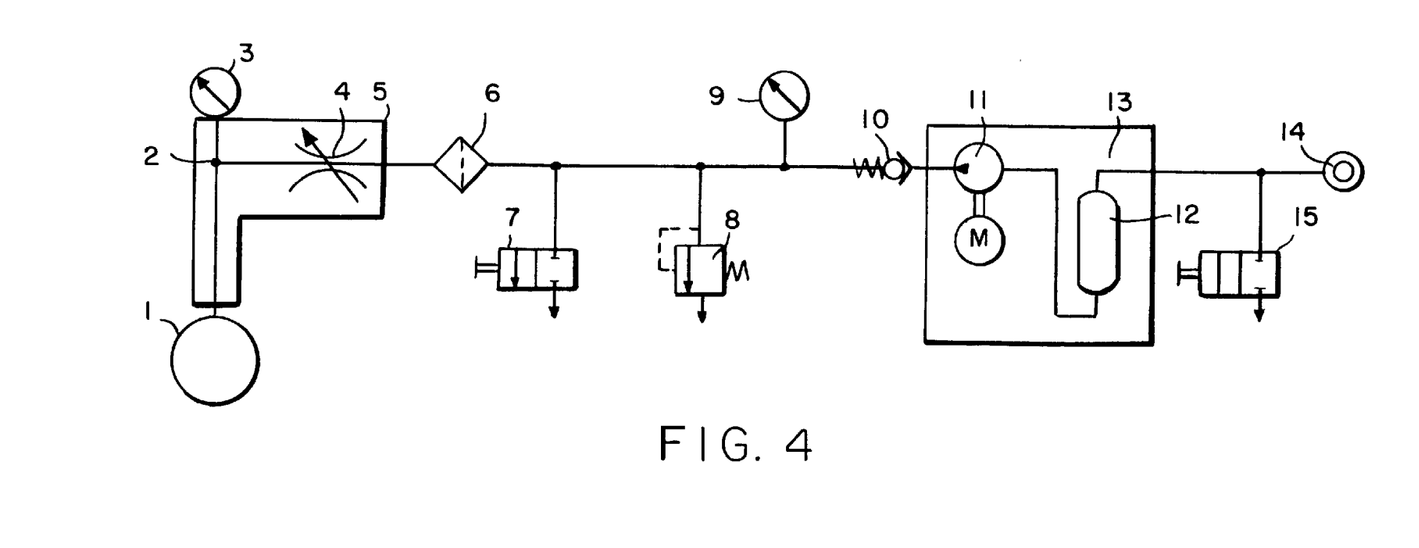
FIG. 4 illustrates the preferred carbon dioxide metering system employed in the microcellular extrusion system of the present invention.

Thus, the blowing agent metering system illustrated in FIG. 4 was constructed. As illustrated therein, carbon dioxide is supplied continuously by a carbon dioxide cylinder (14) at a pressure of 6 MPa. Before start-up the carbon dioxide is liquefied and collected in the liquefaction chamber (12). The liquefaction chamber (12) is placed in a freezer (13) and cooled to a temperature of −22° C. The carbon dioxide is in its liquid state at this temperature and pressure. Since the exit of the liquefaction chamber (12) is at its lowest point, only liquid carbon dioxide will be supplied to the metering pump (11). During operation the carbon dioxide liquefies continuously and no further control action is required.

To start the injection of the carbon dioxide into the polymer melt, the following procedure is required. The extruder (1) is running stable and the tubing between extruder (1) and the high temperature nucleator (4) is filled with frozen polymer from the previous run of the system. The first step is to heat the tubing with the heating tape (5) to the processing temperature of the polymer. Once the polymer inside is molten the pressure meter (3) reads the pressure inside the extruder barrel (1) at the gas injection point. Once this pressure is stable the diaphragm pump (11) is turned on with the setting at the highest flow rate. The pressure between the pump and the high temperature nucleator increases slowly and can be monitored at the pressure meter (9). The pump (11) is placed in the freezer (13) next to the liquefaction chamber (12).

Due to the compression of the carbon dioxide the temperature of the pump head rises. The heat generation with carbon dioxide is significantly higher than with Freon-22. If the heat can not be transferred away from the pump head, the carbon dioxide could change its phase from liquid to gas. It is absolutely crucial for precise metering action of the pump (11) that no trace of a gas is contained in the pump head. Because the pump (11) was originally designed to meter Freon-22, the cooling port of the pump head was not sufficient. Placing the pump (11) in the freezer (13) ensured precise metering of liquid carbon dioxide.

Once the pressure at the pressure meter (9) has risen 2 MPa above the pressure at the pressure meter (3), the flow rate of the diaphragm pump (11) is set to the desired and the high temperature nucleator (4) is opened. The continuous flow of the carbon dioxide purges the molten polymer out of the tubing and back into the extruder barrel.

In an industrial scaled-up system the diaphragm pump rpm would be linked to the rpm of the gear throttle, because the ratio of both is constant for a certain carbon dioxide content in the polymer.

The whole carbon dioxide metering system contains two safety features, a pressure relief nucleator (8), which is set to 40 MPa and an internal pressure relief nucleator of the diaphragm pump (11) which prevents it from supplying pressure above 41.4 MPa.

It should be noted that although the flow rate of the diaphragm pump is capable of very precise metering, it camuot be calculated directly from the plunger volume and the stroke frequency. The efficiency of a diaphragm pump is much lower than its theoretical capacity due to compressibility of the metered fluid and internal leakage of hydraulic fluid. A calibration device was not used during this invention, but if desired, it would be a useful addition to the set-up. However, the amount of gas injection was evaluated qualitatively and calibration of the flow rate at process conditions is recommended for the future.

One aspect of the invention takes advantage of the fact that a blowing agent metering system is provided as well as a precise flow control device embodied in gear nucleator 56. Accordingly, blowing agent can be delivered through orifice 32 into the extruder system 46, and this delivery can be metered while the flow of the fluid precursor of foamed material within the extruder system is controlled. The flow rate of the fluid precursor within the extruder can be determined based upon speed of rotation of the gear nucleator and the blowing agent can be introduced at a rate responsive to the flow rate of the fluid precursor. Additionally, the flow rate of the fluid precursor and the introduction rate of the blowing agent can be individually controlled and adjusted relative to each other to achieve a desired ratio. By "controlled" or "controlling" it is meant changing the flow rate or introduction rate, or maintaining the flow rate or introduction rate at a constant value with the capability of changing the value. A controller (not illustrated) such as a microprocessor or manual controller can interconnect the drive and/or brake mechanism (not shown) of the gear nucleator and the metering system for supplying the blowing agent.

4. Gear Throttle Nucleation Device (Gear Nucleator)

In order to obtain the desirable pressure drops for the invention, a gear pump was used, consisting of a pump body, which contains two intermeshing gears. One of the gears is driven by a motor and the fluid is metered by positive displacement of the gear teeth. If the inlet pressure is higher than the outlet pressure, it acts as a throttle. The gear throttle was supplied by Parker Haimifin—Zenith Pump Division. It features a capacity of three cubic centimeters per revolution with a maximum rpm of 60. Therefore the maximum capacity of the throttle is 180 cubic centimeters of polymer (in our case polymer/gas solution) per minute. During the processing of low density polyethylene (PE-LD) with an inlet pressure at the gear throttle of 18.6 MPa, screw rpm of 28 and a melt temperature of 176° C. the flow rate was 20 cubic centimeters per minute. The gear throttle is rated to a maximum differential pressure of 27.6 MPa and a maximum body pressure of 69 MPa.

5. Tube Die

The die was donated to MIT by Haka AG of Switzerland. It is one of their production tube dies used for extrusion of polypropylene tubing. The polymer flow delivered is centered to the die and is spread around a centerpiece which is suspended from the outer wall of the die. The only modification made thereto was the substitution of the first segment of the die, which starts spreading the polymer around the centerpiece. This substitution was necessary for mounting the adapter flange. Additionally, the new die segment features a shorter manifold with a length reduction of 90% compared with the original segmclnt. The reason for the shortened manifold is to decrease the residence time of the nucleated polymer in the die. It was believed that a long residence time would adversely effect the microstructure of the product negatively, because larger bubbles tend to grow while consuming smaller bubbles, as long as the polymer matrix is soft enough (Baldwin, 1994). This would result in large cell sizes in the final product.

The second reason for the shorter manifold is that the chance that the bubbles are sheared and deformed and coalesce is higher the longer the path the foam must traverse through the die. This would result in larger cell sizes and an overall poor microstructure also. Since larger bubbles tend to get sheared more easily than small bubbles in the same shear field, it is assumed that microcellular bubbles are deformed significantly less than bubbles of conventional foams. However, since microcellular materials with cell sizes of this invention have not been possible before, it is not known how small the bubbles have to be to maintain the spherical shape even in a shear field common for an extrusion process. On the other hand, it is most likely that a dimensionless group exists, which would describe under which conditions bubbles are deformed or remain their spherical shape.

6. Operation of the Experimental Setup

The experimental microcellular polymer extrusion system is intended to work automatically. Once the operating parameters are set and the extrusion system reaches stable state, no further control action by the operator is required. Two controllers are responsible for the proper operation of the system. A speed controller maintains the rpm of the gear throttle and a pressure controller maintains the inlet pressure at the gear throttle by varying the extruder rpm.

The following procedure is required to start the system: First the chiller, which circulates the cooling water for cooling of the hopper section of the extruder and the polymer seal of the gear throttle has to be turned on. Since the flow rate of the water is not controllable, the temperature at the controller must be set to the required for the polymer Next, extruder and gear throttle controls need to be turned on and the temperature controllers of the extruder, the adapter flanges, the gear throttle and the die have to be set to the desired values. Meanwhile, gas liquefaction can be started while the extruder is heating up.

It should be mentioned at this point that a safety contaminant of 9.2 mm thick polycarbonate sheets was installed to shield extruder, gear throttle, most parts of the die and the gas metering system. During stable operation the gear throttle controller is set to a certain flow rate. This flow rate is maintained very precisely by the controller. Since this flow rate creates a certain pressure at the outlet of the gear throttle in combination with the die resistance, this pressure is also constant. The inlet pressure of the gear throttle is maintained by the pressure controller. If this controller is properly tuned, the inlet pressure is also constant. The result is a very constant differential pressure.

Once the system reached equilibrium state under the given process conditions, carbon dioxide can be injected.

Experimental Results

The experiments presented herein were performed at a very early point in time after the setup of the microcellular polymer extrusion system was finished. The upgrade of the system with a more powerful motor capable of running the extruder at much higher rpms is expected to provide even better results than those discussed herein.

Therefore, these experiments merely demonstrate the effectiveness of the present invention. The Inventors believe that improvements are possible without departing significantly from the present teachings, merely by improving the processing equipment as suggested herein.

Two factors influenced the selection of the experiments conducted in connection with this invention. First, high gear throttle inlet pressures were required. The higher the inlet pressure the higher must be the rpm of the extruder. On the other hand, an increase of the flow rate by speeding up the gear throttle would also increase the extruder rpm.

Most all experiments were set up to achieve the highest possible gear throttle inlet pressures for the following reasons. The higher the inlet pressure at the gear throttle is, the shorter is the diffusion time of the gas into the polymer, which is important to ensure a single phase solution formation. Second, higher saturation pressures would allow more gas to dissolve into the polymer, which is the key issue for microcellular polymer processing since supersaturation is the driving force for nucleation. On the other hand, the flow rate of the polymer/gas solution should be maximized also, because it determines the discharge pressure at the gear throttle. An increase of the discharge pressure would make it possible to increase the inlet pressure also, because the differential pressure of the gear throttle is limited to 27.6 MPa only. Additionally, higher flow rates, closer to industrial production rates, would give a more realistic view of the system behavior.

A. Low Density Polyethylene (PE-LD)

The first experiments were done with low density polyethylene (PE-LD). All experiments were done at the same pressure and temperature conditions. The conditions summarized are:

(a) $P_{sat}$=23 MPa (saturation pressure)

(b) P=20.7 Mpa (pressure drop)

(c) $t_m$=191° C. (temperature of the single-phase solution)

(d) G=15 cm$^3$/min (flow rate of the single-phase solution)

Scanning electron microscope (SEM) micrographs of the fracture surface of a sample processed with a medium gas concentration were reviewed at different magnifications (results not shown). At the higher magnifications, it was clear that very small cells were formed. The SEM appearance of this sample can be summarized as follows:

(1) Large non-uniform clusters of gas and polymer (2) small cells in the polymer clusters (3) average cell size of the small cells 0.4 µm (4) cell density of small cells in the polymer clusters 6.6–10$^{11}$ cells per cubic centimeter (5) small bubbles are spherical and not deformed The explanation for the big gas clusters is that the gas did not dissolve completely in the polymer. Therefore, due to the limited screw speed, the mixing by the extruder was not sufficient enough to decrease diffusion time. On the other hand, the microstructure in the polymer clusters is supermicrocellular.

When a sample processed with higher carbon dioxide concentration than used above was analyzed by SEM, the polymer clusters had cells smaller than 0.5 µm and less than 0.1 µm. The average cell size in the polymer clusters is 0.1 µm with a cell density of 1.56·10$^{14}$ cells per cubic centimeter. This is totally supermicrocellular. The macroscopic view of the sample was similar to that described above. The explanation of the higher cell density and smaller cell size is that this cluster contained a higher gas concentration before the pressure drop. Therefore the supersaturation level was higher, which resulted in higher cell density.

B. Polypropylene (PP)

The next polymer examined was polypropylene (PP). The processing conditions were:

(a) $P_{sat}$=27.6 MPa (saturation pressure)
(b) P=26.2 MPa (pressure drop)
(c) $t_m$=222° C. (temperature of the single-phase solution)
(d) G=12 cm³/min (flow rate of the single-phase solution)
(e) medium gas concentration SEM analysis (not shown) of the fracture surface of polypropylene at different magnifications revealed that the amount of big gas cluster resulting from non dissolved gas is much less than in the polyethylene samples. This is due to higher saturation pressures which are possible to achieve during processing of polypropylene. Because of the higher saturation pressure, diffusion time decreased because of the higher density of the carbon dioxide.

The samples were fractured both in extrusion direction and perpendicular to extrusion direction. The small cells are not deformed in extrusion direction due to shear. The appearance of this sample can be summarized as follows:

(1) few large clusters of gas
(2) uniform supermicrocellular structure in the polymer matrix
(3) average cell size of the small cells 0.3 µm
(4) cell density of small cells in the polymer clusters $9.5 \cdot 10^{12}$ cells per cubic centimeter
(5) small bubbles are spherical and not deformed The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A method of producing supermicrocellular polymer foams comprising forming foamed polymers with average cell sizes of less than about 0.05 µm by extruding a single-phase solution of a polymer and a gas through a nucleation device associated with an extruder, wherein the nucleation device is a gear pump acting as a throttle nucleator.

2. A method of making cellular polymeric material, comprising:
   establishing an elevated pressure stream of a fluid mixture of a precursor of foamed polymeric material admixed homogeneously with a blowing agent, the fluid mixture being essentially free of gaseous cells and nuclei of gaseous cells and flowing at a rate of at least about 15 cm³/min; and
   continuously nucleating the blowing agent admixed with the polymeric material to be foamed by lowering the pressure of the fluid mixture at a high rate at a region through which the stream passes to continuously produce a nucleated mixture; and
   subjecting the nucleated mixture to pressure and temperature conditions that create a closed-cell foamed polymeric material having regions of cells smaller than 1.0 µm.

3. A method as in claim 2, involving subjecting the nucleated mixture to pressure and temperature conditions that create a closed-cell foamed polymeric material having regions of cells smaller than 0.5 µm.

4. A method as in claim 2, involving subjecting the nucleated mixture to pressure and temperature conditions that create a closed-cell foamed polymeric material having regions of cells smaller than 0.1 µm.

5. A method as in claim 2, involving subjecting the nucleated mixture to pressure and temperature conditions that create a closed-cell foamed polymeric material having regions of cells of average size smaller than 0.5 µm.

6. A method as in claim 2, the subjecting step involving allowing the nucleated mixture to foam and shaping the foamed nucleated mixture under conditions to produce a microcellular polymeric material.

7. A method as in claim 2, involving establishing an elevated pressure stream of a fluid mixture of a precursor of foamed polymeric material admixed homogeneously with a supercritical fluid.

8. A method of extruding foamed polymeric material comprising:
   establishing a stream of a fluid mixture of a precursor of foamed polymeric material admixed homogeneously with a blowing agent in an extruder passageway at a rate flow in a downstream direction from an inlet end of the passageway toward an outlet end thereof; and
   controlling the rate of flow of the stream by obstructing the passageway completely with a wall, causing the wall to move in a downstream direction within the passageway, and reopening the passageway by removing the wall.

9. A method as in claim 8, involving establishing a stream of a fluid mixture of a precursor of foamed polymeric material admixed homogeneously with a supercritical fluid, the method further comprising obstructing the stream with the wall thereby causing a pressure drop in the stream to occur upon removal of the wall causing the stream to nucleate, the method further comprising allowing the nucleated stream to foam and shaping the stream to produce a microcellular polymeric article.

10. A method comprising:
    establishing a stream of a fluid mixture of a precursor of foamed polymeric material admixed homogeneously with a blowing agent by delivering the blowing agent into the stream at a rate of delivery;
    metering the rate of delivery of the blowing agent in relation to the rate of flow of the stream and maintaining the blowing agent essentially at its saturation level in the mixture;
    advancing the stream at a rate of flow;
    successively isolating successive portions of the stream at the elevated pressure and successively releasing each isolated portion of the stream into a region of pressure lower than the elevated pressure and combining the successive portions to define a homogeneous nucleated stream; and
    continuously foaming the precursor by allowing the blowing agent to expand and foam the material.

11. A method as in claim 10, involving establishing a stream of a fluid mixture of a precursor of foamed material admixed homogeneously with a supercritical fluid, the method further comprising shaping the stream to create a microcellular article.

12. A method as in claim 10, involving continuously nucleating the blowing agent using a gear nucleator.

13. A method as in claim 12, further comprising allowing the nucleated mixture to foam and shaping the mixture to create a microcellular material.

14. A continuous method of malking cellular polymeric material, comprising:

establishing an elevated pressure stream of a fluid mixture of a precursor of foamed polymeric material admixed homogeneously with a blowing agent, the fluid mixture being essentially free of gaseous cells and nuclei of gaseous cells and flowing in a direction; opposing the flow of the stream to create a pressure drop and to produce a nucleated stream; and subjecting the stream to pressure and temperature conditions that create a closed-cell microcellular material having regions of cell density of at least about $10^{11}$ cells/cc.

15. A method as in claim 14, involving subjecting the fluid mixture to pressure and temperature conditions that create a closed-cell microcellular polymeric material having regions of cells smaller than 1.0 μm.

16. A method as in claim 14, involving subjecting the fluid mixture to pressure and temperature conditions that create a closed-cell foamed microcellular polymeric material having regions of cells smaller than 0.5 μm.

17. A method as in claim 14, involving subjecting the fluid mixture to pressure and temperature conditions that create a closed-cell foamed microcellular polymeric material having regions of cells smaller than 0.1 μm.

18. A method as in claim 14, involving subjecting the fluid mixture to pressure and temperature conditions that create a closed-cell foamed microcellular polymeric material having regions of cells of average size smaller than 0.5 μm.

19. A method as in claim 14, involving subjecting the fluid mixture to pressure and temperature conditions that create a closed-cell foamed microcellular polymeric material having regions of cells of average size smaller than 0.1 μm.

20. A method as set forth in claim 1, wherein the extruder is a wire coating extruder.

21. A method as in claim 6, wherein the microcellular polymeric coating is formed around a wire.

22. A method as in claim 8, wherein the extruder is a wire coating extruder.

23. A method as in claim 11, wherein the stream is shaped to create a microcellular polymeric coating around a wire.

24. A method as in claim 14, wherein the closed-cell microcellular material is formed around a wire.

* * * * *

UNITED STATES PATENT AND TRADEMARK OFFICE
CERTIFICATE OF CORRECTION

PATENT NO. : 6,005,013

DATED : December 21, 1999

INVENTOR(S) : N. Suh, et al.

It is certified that error appears in the above-identified patent and that said Letters Patent is hereby corrected as shown below:

Title page, insert the following item:
--[60] Provisional application No. 60/002,295, August 14, 1995.--

Column 1, line 4, insert the following:
 --CROSS REFERENCE TO RELATED APPLICATION
Reference is made to and priority claimed from U. S. Provisional Application Serial No. 60/002,295, filed August 14, 1995, entitled Gear Throttle As A Nucleation Device In A Continuous Microcellular Extrusion System.--

Signed and Sealed this

Sixteenth Day of January, 2001

Attest:

Q. TODD DICKINSON

Attesting Officer  Commissioner of Patents and Trademarks